Dec. 7, 1948.  H. S. HOFFAR  2,455,487
ANTIFRICTION WORM GEARING
Filed Jan. 12, 1944
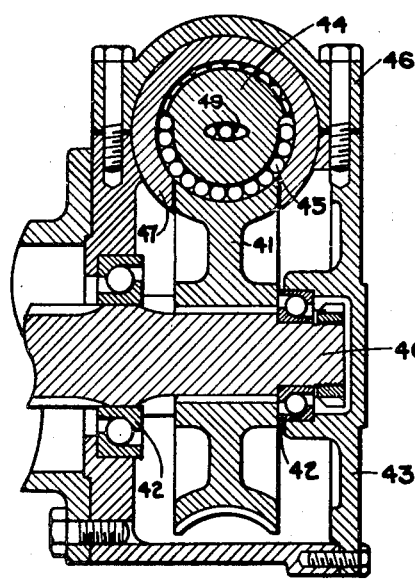
Fig—1
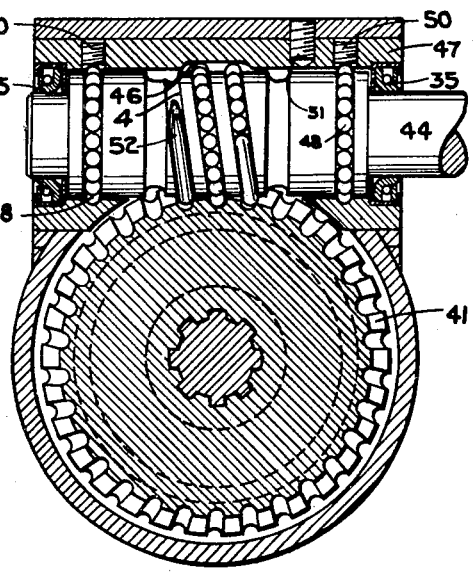
Fig—2
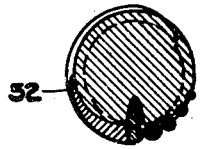
Fig—4
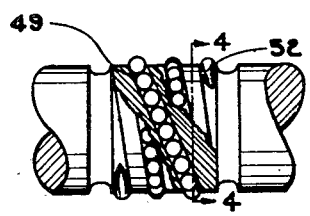
Fig—3
Inventor
Henry S. Hoffar
By Reynolds & Beach
Attorneys Patented Dec. 7, 1948

2,455,487

UNITED STATES PATENT OFFICE 2,455,487

ANTIFRICTION WORM GEARING

Henry S. Hoffar, Vancouver, British Columbia, Canada, assignor to The Cleveland Pneumatic Tool Company, Cleveland, Ohio, a corporation of Ohio Application January 12, 1944, Serial No. 517,927

2 Claims. (Cl. 74—458)

The present invention relates to antifriction screw devices, and more particularly to improvements in mechanism operating on the same general principle as the structure specifically disclosed in my Patent No. 2,298,011, issued October 6, 1942. This application is a continuation in part of my application issued April 23, 1946, as Patent No. 2,398,789.

The particular adaptations of antifriction mechanism embodied in the device of my aforesaid patent included a screw and nut between which bearing balls were recirculated during relative axial movement of the screw and nut. In this construction each of the principal elements included a helical groove of arcuate cross-section, and the pitch of the helixes and the depths of the grooves in the two members were approximately equal. Consequently equal segments of balls interengaged between the members were received in each of the screw and nut grooves. During relative longitudinal movement of the screw and nut the balls moved successively through a by-pass passage formed in the nut from the end of its helical groove moving off the screw into its end moving onto the screw, for recirculation between these members.

The present invention contemplates the use of a short screw in conjunction with a complemental member having a concave groove of considerably greater, or infinite, effective length, between which members again are engaged bearing balls in a manner similar to the disclosure of my patent mentioned above. Thus the member cooperating with the screw may be either a nut of a length considerably greater than the length of the screw, or a worm wheel, which, of course, is of infinite effective length. In neither of these structures can the balls be recirculated through a passage such as disclosed in my patent. The efficiency of the assembly is destroyed, however, if the balls are not allowed to move along the grooves of the cooperating elements, and travel of such elements is undesirably limited if the balls can have only finite travel along the grooves between the members, instead of actually being recirculated. It is very desirable to provide recirculation of balls in an antifriction system incorporating a short screw and a cooperating grooved member, such as a worm wheel, of greater effective length, the balls serving to interconnect the two members. As herein shown, the apparatus is constructed so as to recirculate the balls through a by-pass in the screw, and so that the by-pass passage will be easy and economical to form.

It is a primary object herein to provide an improved type of controlling mechanism for guiding movement of the balls into and out of such by-pass passage. It follows that it is desirable practically to construct such a device in which at least the balls and ball engaging elements are completely enclosed, so that the parts may be lubricated effectively, while dirt and other foreign matter are excluded, and to provide a construction which is easy to assemble and maintain.

Advantages inherent in the structure disclosed in the drawings will be understood from the following description. Various alterations in details may, of course, be made within the scope of my invention, to adapt the mechanism to particular installations.

Figure 1 is a vertical section through worm and worm wheel mechanism embodying my invention, and Figure 2 is a vertical section through the same mechanism taken perpendicularly to the view of Figure 1, showing the worm screw in elevation.

Figure 3 is a plan view of the worm screw only, shown in Figure 2, and Figure 4 is a transverse section through the worm screw of Figure 3 on line 4—4 of that figure.

In order to recirculate the balls between the worm and worm wheel during rotation of the worm and driven rotation thereby of the wheel, I provide within the screw or worm a by-pass passage for the balls extending from a point near one end to a point near the other end of the helical screw groove in which the balls travel in engaging successive grooves in the wheel. Depending upon the direction of rotation of the screw the worm will, of course, rotate in one direction or the other and, as will be evident, the balls will pass in one direction or the other through the by-pass passage in circulating in the screw groove. In any one direction of rotation the balls will continue to circulate in this manner to the ends set forth in my prior patent above cited.

Whereas in a screw and nut assembly where the nut encompasses the screw completely and ordinarily serves to retain the balls in the screw groove between opposite ends of the internal by pass, in a worm drive the worm wheel, such as wheel 41, embraces the worm screw 4 over only a minor fraction—perhaps one-quarter—of its circumference, necessitating additional provision to retain the balls in the screw groove over the remaining portions of its length about the screw circumference.

In the worm screw and worm wheel mechanism shown a shaft 40 carrying the worm wheel 41 is journaled appropriately in bearings 42 received in casing 43. The shaft and worm wheel may be interengaged for conjoint rotation by complemental splined portions as shown in Figure 1, if desired. The worm screw shaft 44 extends perpendicularly to the worm wheel shaft 40. The helical groove forming the screw 4 has a circular segmental cross section, and the worm wheel 41 has complementary concave groove sections of similar circular segmental cross section. As shown in Figures 1 and 2, therefore, the circulating balls 45 have equal spherical segments engaged in the screw groove and in the concave worm groove.

Also the balls 45 preferably, though not necessarily, include large balls spaced by alternate slightly smaller balls as described in my Patent No. 2,298,011. I have found that even though a relatively small number of balls is interengaged between the worm screw and the worm wheel, such an arrangement considerably reduces the friction between the balls and correspondingly increases the efficiency of the mechanism.

As will be evident, the worm wheel is capable of retaining the balls in the screw groove over only approximately one-quarter of its circumference. To hold the balls in the remainder of the screw groove, therefore, a special retainer construction embraces the periphery of the screw, kept in place by the cover 46, attached by suitable screws to casing 43, as shown in Figure 2. This ball retainer takes the form of a sleeve 47 slotted at one side to fit closely alongside the opposite faces of the worm wheel 41, as illustrated in Figure 2. This slot may be milled so that its ends are curved generally in conformity with the curvature of worm wheel 41 and lie close to its periphery, as in Figure 1.

In the opposite ends of sleeve 47 and in the adjacent portions of screw shaft 44 are formed complemental annular grooves for receiving balls 48, to constitute thrust bearings. These balls may be inserted into the complemental grooves through holes in the upper side of sleeve 47, closed by screws 50 before cover 46 is placed over the sleeve. After this cover is applied circumferential shifting of the sleeve relative to it may be prevented by a screw 51 screwed into registering holes in the sleeve and cover. The antifriction worm and worm wheel mechanism is thus completely enclosed, and the ends of sleeve 47 may be sealed by suitable packing 35 to retain lubricant and to keep out dirt.

As shown in Figure 2, the central portion of sleeve 47 is also recessed peripherally to afford sufficient clearance for movement of balls 45 received in the helical groove of worm screw 4, but sufficiently shallow to prevent the balls escaping from such screw groove when they are not in contact with the worm wheel. Preferably such annular recess should therefore be of approximately the same depth as the groove in the screw and worm wheel.

In the worm screw of the assembly, as best seen in Figure 3, the by-pass passage 49, extending between opposite sides of the worm, is inclined lengthwise between opposite ends of the helical groove, preferably in a longitudinal diametral plane for ease in boring the passage hole. For a purpose which will appear the total length of the helical screw groove exceeds the length of its ball engaging portion between opposite ends of the by-pass passage 49 by more than one-half a turn at each end.

In each end portion of the helical groove is a deflector 52 in the form of an arcuate spring clip of a length exceeding one-half the periphery of the worm screw. The end of each of these clips remote from the adjacent end of the helix forms a continuation of the wall of the corresponding by-pass passage opening, and is concave for engagement by the balls 45 to deflect them for movement into the by-pass bore 49 from the helical groove, or for movement into such groove of balls emerging from the by-pass.

Such resilient clips may be applied readily to the worm screw, being held frictionally in place, and, of course, may be utilized with any type of internal by-pass through the screw. Not only does such a clip simplify the construction of the composite mechanism over the case where integrally formed or fixed deflecting projections are utilized, but the use of such clips permits greater standardization and results in longer life of the parts. If the deflecting end of the clip shows signs of wear the clip need simply be rotated slightly to bring its end again into proper registry with the end of the by-pass passage, as desired.

The invention is not necessarily limited to the particular form shown, however, since I contemplate other applications in which its principles may be utilized to advantage.

I claim as my invention:

1. Antifriction mechanism comprising complemental members having cooperating helical grooves therein, a plurality of balls interconnecting said members by engagement in the helical grooves thereof, one of said members having a by-pass passage therethrough extending between spaced portions of the helical groove in such member, and a resilient clip embracing and resiliently gripping the member having such by-pass over a peripheral extent exceeding one half of the circumference of such member, one end of said clip being disposed adjacent to an end of such by-pass and shaped to guide balls engaged thereby for movement between the adjacent end of the by-pass and the portion of the helical groove into which such by-pass opens.

2. Antifriction mechanism comprising complemental members having cooperating helical grooves therein of substantially equal depth, a plurality of balls interconnecting said members by having substantially equal spherical segments engaged in the helical grooves thereof, one of said members having a by-pass passage therethrough extending between spaced portions of the helical groove in such member, and a resilient clip of arcuate shape received in the helical groove of the member having such by-pass, one end of said clip projecting out of such groove and being disposed adjacent to an end of such by-pass and shaped to guide balls engaged thereby for movement between the adjacent end of the by-pass and the portion of the helical groove into which such by-pass opens, and said clip extending from such end about the member having such by-pass in its groove over a peripheral extent exceeding 180 degrees and thereby resiliently gripping such member.

HENRY S. HOFFAR.

REFERENCES CITED

The following references are of record in the file of this patent:

UNITED STATES PATENTS

| Number | Name | Date |
| --- | --- | --- |
| 506,409 | Wellman | Oct. 10, 1893 |
| 1,152,001 | Brinkman | Aug. 31, 1915 |

FOREIGN PATENTS

| Number | Country | Date |
| --- | --- | --- |
| 19,325 | Great Britain | Sept. 20, 1905 |
| 209,737 | Great Britain | Jan. 7, 1924 |